April 22, 1924.
D. H. NASH
1,491,724
CRANK SHAFT STARTING PIN
Filed June 27, 1919
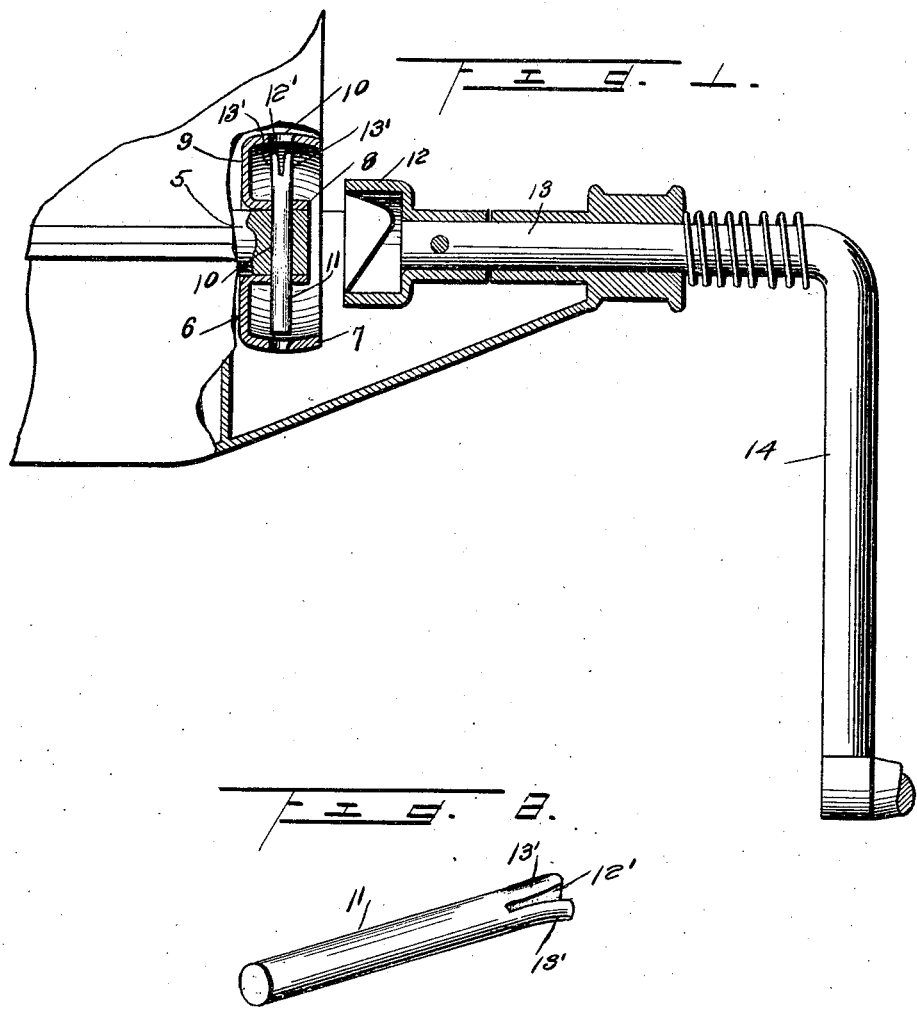
Inventor
D. H. Nash.
By (signature)
Attorney.

Patented Apr. 22, 1924.

1,491,724

UNITED STATES PATENT OFFICE.

DAVID H. NASH, OF PETERSBURG, VIRGINIA, ASSIGNOR TO FRANCIS F. WHITTLE, OF PETERSBURG, VIRGINIA.

CRANK-SHAFT STARTING PIN.

Application filed June 27, 1919. Serial No. 307,126.

*To all whom it may concern:*

Be it known that I, DAVID H. NASH, a citizen of the United States, residing at Petersburg, in the county of Dinwiddie and State of Virginia, have invented certain new and useful Improvements in Crank-Shaft Starting Pins; and I do hereby declare the following to be a full, clear, and exact description of the invention, such as will enable others skilled in the art to which it appertains to make and use the same.

My invention relates to improvements in motors and more particularly to the connecting means between the main drive shaft and the starting crank handle.

An important object of this invention is to provide means for rigidly and quickly fastening the fan pulley of a motor to the crank shaft thereby reducing to an appreciable extent the time required in assembling the motor.

A further object of the invention is to provide a connecting pin for securing the drive pulley for a fan to the crank shaft of a motor without the necessity of employing cotter pins or other separate fastening means.

A further object of the invention is to provide a fastening pin for securing the fan pulley to a crank shaft which upon being positioned presents a smooth outer surface adapted to be engaged by the ratchet of a starting crank.

A further object of the invention is to provide a locking pin having a slot in one end portion thereof thereby providing outwardly diverging arms adapted to form locking members.

Other objects and advantages of the invention will be apparent during the course of the following description.

In the accompanying drawings forming a part of this application and in which like numerals are employed to designate like parts throughout the same, Figure 1 is a fragmentary section through a vehicle motor illustrating the application of my improved locking pin to a fan wheel and crank shaft, and, Figure 2 is a perspective of the locking pin.

In the drawings wherein for the purpose of illustration is shown a preferred embodiment of my invention, the numeral 5 designates the crank shaft of a motor. As in the case of a modern motor, an annular fan pulley 6 is mounted on the front end portion of the shaft 5 and includes an outer transversely curved rim 7 and an inner annular attaching collar 8. The members 7 and 8 are connected by an annular bight portion 9. The shaft 5 and the annular bodies 7 and 8 are provided with alining openings 10 receiving a pin 11, for securing the fan pulley in place and serving as a connecting means for a ratchet 12 and the shaft 5. The ratchet 12 is mounted on a shaft 13 which is connected to a crank handle 14.

In the case of the connecting pin now employed in assembling the parts just described, a cotter pin is inserted through one end portion of the connecting pin for retaining the same in position. To eliminate the time necessary in inserting and subsequently spreading a cotter pin in the locking pin, I have provided a longitudinal slot 12′ in one end portion of the pin and have flared the arms 13′ provided thereby outwardly for forming locking members.

In securing the fan pulley to the shaft in accordance with my invention, the locking pin 11 may be hammered through the openings 10 and by reason of the fact that the diameter of the arms 13′ is greater than the diameter of the opening 10 in the annular body 7, the pin is prevented from accidental displacement.

In dispensing with the cotter pin usually employed a smooth engaging surface is provided for the ratchet 12.

In employing the construction above outlined and the mode of assembly the fan pulley may be secured to the shaft much more expeditiously and without the inconvenience necessarily present in the use of cotter pins as retaining members.

While I have shown and described the preferred embodiment of my invention, it is understood that such minor changes in arrangement and construction of parts may be made as will remain within the spirit of the invention and the scope of what is claimed.

Having thus described my invention, what I claim is:—

1. A crank shaft pin comprising a cylindrical body adapted to be extended through alined openings in the hub and rim of a fan pulley and a crank shaft, and adapted to be engaged adjacent each end by the teeth of a clutch element secured to a hand crank, said body having a longitudinal slot extending inwardly from one end to form arms adapted to be bent oppositely from each other and laterally of the body so as to cooperate with the rim to prevent the accidental displacement of the pin through the aperture in the rim.

2. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and means carried by the pin within the rim and contractible to permit the insertion of the pin through the aperture in the rim and adapted to cooperate with the rim to prevent the accidental displacement of the pin through the aperture in the rim.

3. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and said pin having laterally offset arms at one end thereof adapted to cooperate with the rim to prevent the accidental displacement of the pin through the aperture in the rim.

4. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and said pin having a slot in one end thereof to provide arms bent outwardly to provide means adapted to cooperate with the rim to prevent the accidental displacement of the pin through the aperture in the rim.

5. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and said pin having a slot in one end thereof to provide arms bent outwardly to provide means adapted to cooperate with the rim to prevent the accidental displacement of the pin through the aperture in the rim, said arms being adapted to be bent inwardly to permit the removal of the pin through the aperture in the rim.

6. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and said pin having one of its ends slotted to provide arms adapted to cooperate with the rim to prevent the accidental displacement of the pin through the aperture in the rim.

7. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and said pin having relatively spaced elements adapted to cooperate with the rim to prevent the accidental displacement of the pin through the aperture in the rim.

8. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and said pin having relatively spaced elements adapted to cooperate with the rim to prevent the accidental displacement of the pin through the aperture in the rim, and contractible to permit the removal of the pin through the aperture in the rim.

9. In a shaft pulley securing device, the combination with a shaft, of a pulley mounted thereon and embodying a hub and a rim surrounding the hub and having an aperture, a removable pin passing through the hub and shaft to secure the pulley to the shaft and adapted to be applied and removed through the aperture in the rim, and means carried by the pin and contractible to permit the removal of the pin through the aperture in the rim and adapted to cooperate with the rim to prevent the accidental displacement of the pin through said aperture.

In testimony whereof I affix my signature in presence of two witnesses.

DAVID H. NASH.

Witnesses:
Geo. B. Carter,
Chas. P. Darracott.